(12) United States Patent
Bhanot et al.

(10) Patent No.: US 8,117,288 B2
(45) Date of Patent: Feb. 14, 2012

(54) OPTIMIZING LAYOUT OF AN APPLICATION ON A MASSIVELY PARALLEL SUPERCOMPUTER

(75) Inventors: Gyan V. Bhanot, Princeton, NJ (US); Alan Gara, Mount Kisco, NY (US); Philip Heidelberger, Cortlandt Manor, NY (US); Eoin M. Lawless, White Plains, NY (US); James C. Sexton, Yorktown Heights, NY (US); Robert E. Walkup, Ossising, NY (US)

(73) Assignee: International Business Machines Corporation, Armonk, NY (US)

( * ) Notice: Subject to any disclaimer, the term of this patent is extended or adjusted under 35 U.S.C. 154(b) by 1450 days.

(21) Appl. No.: 10/963,101

(22) Filed: Oct. 12, 2004

(65) Prior Publication Data

US 2006/0101104 A1    May 11, 2006

(51) Int. Cl.
*G06F 15/177* (2006.01)
(52) U.S. Cl. ........ 709/220; 709/201; 709/223; 717/120; 717/121; 718/100; 718/102; 718/105; 718/106; 719/318; 719/320
(58) Field of Classification Search .......... 709/201–203, 709/217–218, 223, 226, 238, 243–244, 248; 707/1–2, 9–10; 717/101–103, 119, 120–121, 717/151–158, 176–177; 718/102, 106; 719/318, 719/320
See application file for complete search history.

(56) References Cited

U.S. PATENT DOCUMENTS

| | | | | |
|---|---|---|---|---|
| 4,983,962 A | * | 1/1991 | Hammerstrom | 340/825.02 |
| 5,937,201 A | * | 8/1999 | Matsushita et al. | 713/310 |
| 6,021,457 A | * | 2/2000 | Archer et al. | 710/260 |
| 6,374,403 B1 | * | 4/2002 | Darte et al. | 717/161 |

(Continued)

OTHER PUBLICATIONS

Senar et al., "Clustering and Reassignment-based Mapping Strategy for Message-Passing Architectures", IEEE Computer Society, US, Mar. 30, 1998, pp. 415-421.*

(Continued)

*Primary Examiner* — Asad Nawaz
*Assistant Examiner* — Sarah Drabik
(74) *Attorney, Agent, or Firm* — Jon A. Gibbons; Fleit Gibbons Gutman Bongini & Bianco PL

(57) ABSTRACT

A general computer-implement method and apparatus to optimize problem layout on a massively parallel supercomputer is described. The method takes as input the communication matrix of an arbitrary problem in the form of an array whose entries $C(i, j)$ are the amount to data communicated from domain i to domain j. Given $C(i, j)$, first implement a heuristic map is implemented which attempts sequentially to map a domain and its communications neighbors either to the same supercomputer node or to near-neighbor nodes on the supercomputer torus while keeping the number of domains mapped to a supercomputer node constant (as much as possible). Next a Markov Chain of maps is generated from the initial map using Monte Carlo simulation with Free Energy (cost function) $F=\Sigma_{i,j}C(i,j)H(i,j)$– where $H(i,j)$ is the smallest number of hops on the supercomputer torus between domain i and domain j. On the cases tested, found was that the method produces good mappings and has the potential to be used as a general layout optimization tool for parallel codes. At the moment, the serial code implemented to test the method is un-optimized so that computation time to find the optimum map can be several hours on a typical PC. For production implementation, good parallel code for our algorithm would be required which could itself be implemented on supercomputer.

20 Claims, 8 Drawing Sheets

U.S. PATENT DOCUMENTS

| | | | |
|---|---|---|---|
| 6,438,747 B1 * | 8/2002 | Schreiber et al. | 717/160 |
| 6,925,642 B1 * | 8/2005 | Commander | 718/104 |
| 7,103,628 B2 * | 9/2006 | Neiman et al. | 709/201 |
| 7,376,693 B2 * | 5/2008 | Neiman et al. | 709/201 |
| 7,644,142 B2 * | 1/2010 | Chen et al. | 709/220 |
| 2003/0120701 A1 * | 6/2003 | Pulsipher et al. | 709/102 |
| 2004/0103218 A1 | 5/2004 | Blumrich et al. | |

OTHER PUBLICATIONS

Bhanot et al., "The BlueGene/L Supercomputer", Nuclear Physics B. Proceedings Supplements, V. 119, May 2003, pp. 114-121.*

Norman et al., "Models of Machines and Computation for Mapping in Multicomputers", ACM Computing Surveys, Sep. 1993, pp. 263-302.*

Rosenthal, Jeffrey, "Parallel Computing and Monte Carlo Algorithms", Far East Journal of Theoretical Statistics 4, 2000, pp. 207-236.*

Sadayappan et al., "Nearest-Neighbor Mapping of Finite Element Graphs onto Processor Meshes", IEEE Transactions on Computers, vol. C-36, No. 12, Dec. 1987.*

Norman, M., et al., "Models of Machines and Computation for Mapping in Multicomputers," ACM Computing Surveys, V.25/3, Sep. 1993, pp. 263-302, XP002365749, ISSN: 0360-0300.

Senar, M., et al., "Clustering and Reassignment-based Mapping Strategy for Message-Passing Architectures," IEEE Computer Society, US, Mar. 30, 1998, pp. 415-421, XP010276677, ISBN: 0-8186-8404-6.

Bhanot, G., et al., "The BlueGene/L Supercomputer," Nuclear Physics B. Proceedings Supplements, V. 119, May 2003, pp. 114-121, XP005025475, ISSN: 0920-5632.

Bhanot, G., et al., "Optimizing task layout on the BlueGene/L supercomputer," IBM Journal of Research and Development IBM USA, Online! V.49/2-3, Mar. 2005, pp. 489-500, XP002366195, ISSN: 0018-8646.

International Search Report relative to PCT/US2005/036196 dated Feb. 20, 2006.

Baba, T., et al. "A Network-Topology Independent Task Allocation Strategy for Parallel Computers," Proc. of ACM/IEEE Supercomputing '90, 1990, pp. 878-887.

* cited by examiner

| Problem | Size | Method | Cost F | Normalized Cost F/Fmin |
|---|---|---|---|---|
| Cubic 1 | 512 | Ideal | 3072 | 1.0 |
| Cubic 1 | 512 | heuristic | 7360 | 2.4 |
| Cubic 1 | 512 | mpi rank order | 3072 | 1.0 |
| Cubic 1 | 512 | random | 18245 | 5.94 |
| Cubic 1 | 512 | sa 1 | 3072 | 1.0 |
| Cubic 2 | 512 | ideal | 12288 | 1.0 |
| Cubic 2 | 512 | heuristic | 25956 | 2.11 |
| Cubic 2 | 512 | mpi rank order | 12288 | 1.0 |
| Cubic 2 | 512 | random | 54820 | 4.56 |
| Cubic 2 | 512 | sa 1 | 12288 | 1.0 |

*FIG. 11*

| Problem | Size | Method | Cost F | Normalized Cost F/Fmin |
|---|---|---|---|---|
| UMT2000 | 256 | Ideal | 193516 | 1 |
| UMT2000 | 256 | heuristic | 389722 | 2.01 |
| UMT2000 | 256 | mpi rank order | 420990 | 2.18 |
| UMT2000 | 256 | random | 776693 | 4.01 |
| UMT2000 | 256 | sa 7 | 264394 | 1.37 |
| UMT2000 | 256 | sa 4 | 282490 | 1.46 |
| UMT2000 | 256 | sa 2 | 267286 | 1.38 |
| UMT2000 | 256 | sa 1 | 252398 | 1.30 |
| UMT2000 | 1024 | ideal | 782708 | 1 |
| UMT2000 | 1024 | heuristic | 1714512 | 2.19 |
| UMT2000 | 1024 | mpi rank order | 2002734 | 2.56 |
| UMT2000 | 1024 | random | 4967656 | 6.35 |
| UMT2000 | 1024 | sa 32 | 1479240 | 1.89 |
| UMT2000 | 1024 | sa 18 | 1486504 | 1.90 |
| UMT2000 | 1024 | sa 14 | 1451362 | 1.85 |
| UMT2000 | 1024 | sa 8 | 1309312 | 1.67 |
| UMT2000 | 1024 | sa 4 | 1280488 | 1.64 |
| UMT2000 | 1024 | sa 2 | 1252798 | 1.60 |
| UMT2000 | 1024 | sa 1 | 1252798 | 1.55 |

*FIG. 12*

| Problem | Size | Method | Cost F | Normalized Cost F/Fmin |
|---|---|---|---|---|
| SAGE | 256 | Ideal | 169152 | 1 |
| SAGE | 256 | heuristic | 289892 | 1.71 |
| SAGE | 256 | mpi rank order | 366194 | 2.16 |
| SAGE | 256 | random | 826264 | 4.88 |
| SAGE | 256 | sa 32 | 303184 | 1.79 |
| SAGE | 256 | sa 16 | 264170 | 1.56 |
| SAGE | 256 | sa 8 | 269446 | 1.59 |
| SAGE | 256 | sa 4 | 256714 | 1.52 |
| SAGE | 256 | sa 2 | 248712 | 1.47 |
| SAGE | 256 | sa 1 | 239392 | 1.42 |
| SAGE | 2048 | ideal | 730958 | 1 |
| SAGE | 2048 | heuristic | 1019078 | 1.39 |
| SAGE | 2048 | mpi rank order | 2383612 | 3.26 |
| SAGE | 2048 | random | 7257358 | 9.93 |
| SAGE | 2048 | sa 128 | 1110450 | 1.52 |
| SAGE | 2048 | sa 64 | 1105844 | 1.51 |
| SAGE | 2048 | sa 34 | 1131802 | 1.55 |
| SAGE | 2048 | sa 32 | 1127680 | 1.54 |
| SAGE | 2048 | sa 16 | 1066160 | 1.46 |
| SAGE | 2048 | sa 4 | 988772 | 1.35 |
| SAGE | 2048 | sa 1 | 975400 | 1.33 |

*FIG. 13*

| Method | Normalized Cost F/Fmin | Improvement in Cost | Communication Time (seconds) | Improvement in Communication Time |
|---|---|---|---|---|
| rank order | 1 | 1 | 22.818 | 1 |
| random | 1.322 | 0.76 | 19.614 | 1.163 |
| hand crafted | 0.249 | 4.01 | 14.327 | 1.593 |
| sa 8 | 0.270 | 3.70 | 13.837 | 1.649 |
| sa 4 | 0.267 | 3.75 | 13.207 | 1.728 |
| heuristic | 0.254 | 3.93 | 12.790 | 1.784 |
| sa 1 | 0.257 | 3.90 | 12.731 | 1.792 |

*FIG. 14*

OPTIMIZING LAYOUT OF AN APPLICATION ON A MASSIVELY PARALLEL SUPERCOMPUTER

BACKGROUND OF THE INVENTION

1. Field of the Invention

This invention relates in general to the field of supercomputer systems and architectures and, more particularly, to optimally map an arbitrary parallel application in order to minimize execution times on supercomputer systems.

2. Description of the Related Art

Massively parallel computing structures (also referred to as "ultra-scale computers" or "supercomputers") interconnect large numbers of compute nodes. Quite often, the interconnect topology is in the form of regular structures, such as trees or grids sometimes with periodic boundary conditions. The conventional approach for the most cost/effective ultra-scale computers has been to use standard processors (nodes) configured in uni-processors or symmetric multiprocessor (SMP) configurations, with the interconnect network supporting message passing communications. Today, these supercomputing machines exhibit computing performance achieving teraOPS-scale. One example of a supercomputer is the Blue Gene/L Supercomputer (BG/L) announced by International Business Machines of Armonk N.Y. General information regarding the BG/L architecture is available at the online URL ((http://sc2002.org/paperpdfs/pap.pap207.pdf)) with a paper entitled "The Blue Gene/L Supercomputer", by G. Bhanot, D. Chen, A. Gara and P. Vranas, Nucl. Phys. B (Proc. Suppl.) 119 (2003) 114, which is hereby incorporated by reference in its entirety. BG/L is a massively parallel computer with two data communication networks: a nearest neighbor network, with the topology of a 3-D torus, and a global tree. In normal usage, the torus is the primary communications network and is used both for point-to-point and for global or collective communications. The tree is typically used for collective communications.

Computer nodes on BG/L are logically arranged into a 3-D lattice and the torus communications network provides physical links only between nearest neighbors in that lattice. All communications between nodes must therefore be routed to use the available physical connections and the cost of communications between nodes varies depending on the distance between the nodes involved and other effects such as the availability of buffers, the number of available paths through the network, network contention etc. A major challenge then is to optimally map an arbitrary parallel application to minimize the total execution time, which is a function of the time for communication and the time for computation.

The problem of assigning tasks to the processors of a parallel processing computer so as to achieve the optimal load balance and to minimize the cost of interprocessor communication is important if efficient use is to be made of parallel computers. This issue has been studied by many groups in recent years. However, the relative emphasis placed on computational balance as opposed to communication costs, and differing assumptions made as to the numbers of processors and the inter processor network architecture, have lead to many different approaches to the problem.

For small numbers of processors, many techniques can be successfully applied. For instance, a simple heuristic followed by an iterative improvement processes is developed to optimize the layout of tasks on processor networks with up to 64 processors in "Task Assignment on Distributed-Memory Systems with Adaptive Wormhole Routing", Vibha A. Dixit-Radiya and Dhabaleswar K. Panda, Symposium on Parallel and Distributed Processing (SPDP '93), pp. 674-681, which is hereby incorporated by reference in its entirety. This work is unusual in that it includes link contention as well as total traffic volume during layout. A more complex algorithm that produces good results for small numbers of heterogeneous processors is presented in "An efficient algorithm for a task allocation problem", A. Billionnet, M. C. Costa and A. Sutter, J. ACM, Vol. 39, No. 3, 1992, pp 502-518, which is hereby incorporated by reference in its entirety. However it is assumed that communication costs are independent of the communication endpoints, and so while useful for processors linked by a switched network, is less applicable to parallel computers using more complex network topologies.

Graph partitioning techniques have been used in the load balancing problem, and also in clustering tasks to optimize locality in hierarchical networks (for instance a cluster of SMP nodes linked by a switched network in "Implementing the MPI Process Topology Mechanism", Jesper Larsson Traäff, Proceedings of the 2002 ACM/IEEE conference on Supercomputing, 2002, pp. 1-14, which is hereby incorporated by reference in its entirety.) Graph bipartitioning has also been used for task clustering and mapping on eight node hypercubes by "Task Allocation onto a Hypercube by Recursive Mincut Bipartitioning", F. Ercal, J. Ramanujam and P. Sadayappan, Journal of Parallel and Distributed Computing Vo. 10. No. 1 1990 pp 35-44 (herein after "F. Ercal et al."), which is hereby incorporated by reference in its entirety.

Simulated Annealing and related techniques have been applied to the mapping problem by several groups in F. Ercal et al noted in the paragraph above and "A New Mapping Heuristic Based on Mean Field Annealing", Tevfik Bultan and Cevdet Aykanat, Journal of Parallel and Distributed Computing, Vol. 16, No. 4, 1992, pp 292-305 (herein after "Tevfik Bultan et al.", which is hereby incorporated by reference in its entirety. Simulated Annealing is useful to create good mappings, however it is computationally expensive. Mean Field Annealing is an algorithm with similarities to Simulated Annealing, refer to Tevfik Bultan et al. It is applied to problems with up to 400 tasks and 32 processors in hypercube and mesh topologies, and compared to Simulated Annealing, refer to Tevfik Bultan et al.

Other work has limited itself to problems displaying certain communication patterns. For instance in "Rectilinear Partitioning of Irregular Data Parallel Computations", David Nicol, Journal of Parallel and Distributed Computing Vol. 23 No. 2, November 1994, pp 119-134, which is hereby incorporated by reference in its entirety, develops an algorithm for mapping problems with a rectilinear topology. This is extended for problems with a k-ary n-cube work and communication pattern in 'On Bottleneck Partitioning of k-ary n-cubes', David Nicol and Weizhen Mao, Parallel Processing Letters Vol. 6, No. 6, June 1996, pp 389-399, which is hereby incorporated by reference in its entirety.

Although the above solutions are useful, none of the solutions are directed to optimizing mapping N tasks to N processors, which is a more constrained problem than mapping M>>N tasks to N processors. Accordingly, a need exists for optimally map N tasks to N processors for an arbitrary parallel application in order to minimize execution times on supercomputer systems.

Further, computer systems, such as the BG/L, are far larger than the target architectures of previous research; scaling the mapping to thousands of nodes is essential. The 3-D torus of BG/L adds complexity to the mapping problem. Accordingly, a need exists for optimal maps on supercomputers, such as BG/L, and supercomputers using 3-D torus interconnects for an arbitrary parallel application in order to minimize execution times on supercomputer systems.

Continuing further, much attention has been paid to achieving partitions of tasks that balance computational load and minimize inter-partition communication. Far less attention has been spent on placing those partitions on processors linked by a network, such as a torus or mesh, in which the communication costs between different processor pairs varies considerably. This is especially important for a computer such as BG/L since the cost differential between a good and a bad mapping in a torus increases with processor count. Accordingly, a need exists to find a balanced layout for an arbitrary parallel application in order to minimize communications times between tasks on supercomputer systems.

SUMMARY OF THE INVENTION

Briefly, the present invention discloses a computer-implemented method, a computer readable medium and corresponding system for optimally mapping an arbitrary parallel application to a given interconnect network in order to minimize the total communication times on supercomputer systems for which communication costs are dependent on task placement.

A general computer implemented method and apparatus to optimize problem layout on a massively parallel supercomputer is described. The method takes as input the communication matrix of an arbitrary problem in the form of an array whose entries C(i, j) are the amount to data communicated from domain i to domain j. Given C(i, j), first a graph is created whose vertices are the domains and there are links between communicating pairs of domains. The link weights are the amount of data communicated between the domains they connect. This graph is now partitioned into K pieces so that the total communication on links connecting each piece is as small as possible. Currently, METIS (http://www-users.cs.unm.edu/karypis/metis/) is used to do this partitioning but other techniques can be used as well, including algorithms to determine cliques and bicliques in a graph. Next, the domains are assigned within one partition to BG/L nodes so that communicating domains are mapped either to the same BG/L node (while keeping the number of domains mapped to a node uniform so that the final mapping will be compute load balanced) or to the nearest node on the torus that is available. Next a Markov Chain of maps is generated from the initial map using Monte Carlo simulation with Free Energy (cost function) $F=\Sigma_{i,j}C(i,j)H(i,j)$—where $H(i,j)$ is the estimated communication path cost/unit data, e.g., the smallest number of hops on the torus between domain i and domain j. The Markov chain is generated by swapping the domains between BG/L nodes or moving a domain to an unoccupied or partially occupied node (while maintaining compute load balance) and testing using the Metropolis Algorithm ("Markov Chain Monte Carlo in Practice", W. R. Gilks, S. Richardson, D. J. Spiegelhalter (eds), Boca Raton, Fla.: Chapman and Hall (ISBN:0412055511); ' Introduction to the Monte Carlo Method', I. Manno, Budapest, Hungary, 1999 (ISBN: 9630576155). The temperature $(T=1/\beta)$ in the Metropolis procedure is cycled from high to low values and the free energy is normalized by dividing it with an ideal free energy F(min) which would be obtained in a hypothetical (but generally impossible) perfect mapping where all communicating domains are either on the same node or near neighbor nodes. During the Metropolis sweep from high to low temperatures, the average Free Energy of the system is measured at each temperature and the procedure is stopped when this quantity reaches a plateau (approximately fixed value). When this happens, a new partion of domains is mapped to the BG/L nodes using the same heuristic as above and the temperature is again cycled from high to low values. This is repeated until all the domains are mapped to BG/L and the total free energy comes to an approximately equilibrium value. The list of locations of the BG/L node (coordinates (x, y, z) on the torus) for each domain is then written to an output file and constitutes our optimal map. K values in the range of 1 to 32 have been tested with large K values resulting in faster run times and small K values generating better maps.

Although one example of cost function is shown above for $H(i,j)$, it is important to note that the present invention is not limited to this example. Other examples of exemplary cost functions include: $H(i,j)=L_p=(\text{x-hop}P+\text{y-hop}P+\text{z-hop}P)^{1/P}$ where x-hop (y-hop, z-hop) is the number of hops in the x (y, z, respectively) dimension between node I and node j. If p=1, $L_1$, is the number of hops mentioned above. If p=2, $L_2$ is Euclidean distance between nodes I and j. As P increases, this exemplary cost function provides more emphasis on the largest number of hops and approaches the maximum number of hops as P increases to infinity. The aforementioned examples of cost function are straight forward. It is important to note that more complicated cost functions are shown to be used advantageously within the true scope and spirit of the present invention. The use of a more complicated cost function results in a tradeoff due to the requisite computational expense. For example $H(i,j)=\Sigma_{i,j}$ (over all links between i and j) combined with a function for an estimate utilization of each link is a more complicated exemplary cost function and will require more computational expense.

An alternate way to do the mapping which is faster than the procedure described above is to just implement the heuristic and omit the Simulated Annealing step. This heuristic works reasonably well in most cases and generates maps that are close to optimal.

For two applications (SAGE and UMT2000) the simulated annealing and heuristic maps were tested against the default map (rank order). The results of this are described in the paper that is attached in Tables 2 and 3. Compared to the default (rank-order) map, the optimized maps using the procedures in this disclosure were found to reduce the total free energy by factors of 1.5 and 2.5 for SAGE on 256 and 2048 nodes and by a factor of 1.6 for UMT2000 on 256 and 1024 nodes.

To summarize, the computer-implemented method optimizes the mapping of the MPI (Message Passing Interface) asks for a software application across the nodes of a parallel computer for an arbitrary communication network connecting the nodes. The method takes as input the communications map of the software application in the form of a list with the amount of data communicated by each MPI tasks in the application to every other MPI task in the application. It then computes the optimal map of this communication map to a given network of nodes on a target computer by mathematically minimizing an appropriate inter node communication cost function to produce a mapping of the MPI tasks to the nodes of the target computer to minimize the cost function. The goal of the mapping is to reduce the total time to communicate the data between nodes in the original software application.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 11 is Table 1 illustrating optimization results achieved for the Cubic 1 and Cubic 2 cases, according to the present invention.

FIG. 12 is Table 2 illustrating optimization results achieved for UMT2000, according to the present invention.

FIG. 13 is Table 3 illustrating optimization results achieved for SAGE, according to the present invention.

FIG. 14 is Table 4 illustrating communication time results for a 512 processor SAGE run using several optimization maps, according to the present invention.

DETAILED DESCRIPTION OF THE PREFERRED EMBODIMENT

Figure 1:
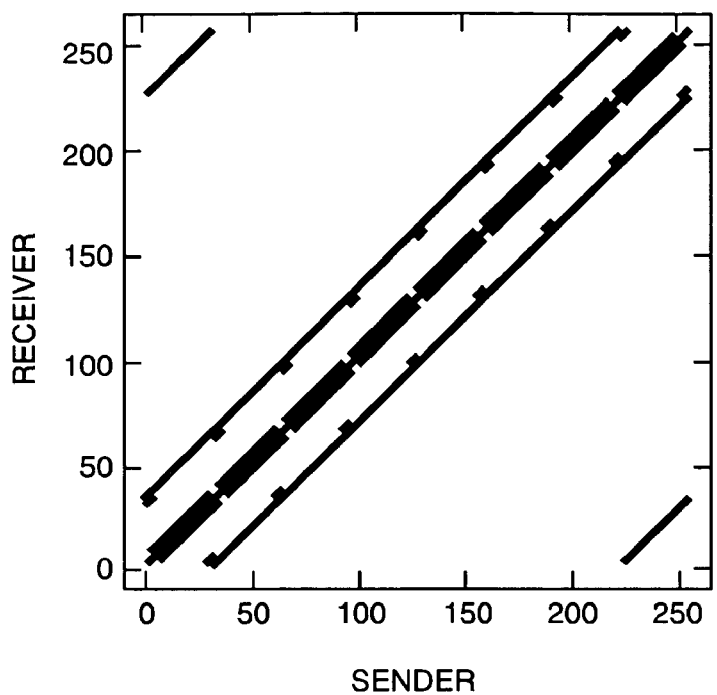
FIG. 1 is a plot of a structure of the communications matrix C(i, j) for an example problem solved according to the present invention.

While the specification concludes with claims defining the features of the invention that are regarded as novel, it is believed that the invention will be better understood from a consideration of the following description in conjunction with the drawing figures, in which like reference numerals are carried forward. The method of the present invention is described as implemented on the specific architecture of the Blue Gene/L supercomputer for illustration. However, it should be noted that the method described is much more general and with an appropriate definition of a cost function, would apply to any set of compute/communication nodes connected by a network.

Generalized Architecture of Blue Gene/L Supercomputer

Figure 9:
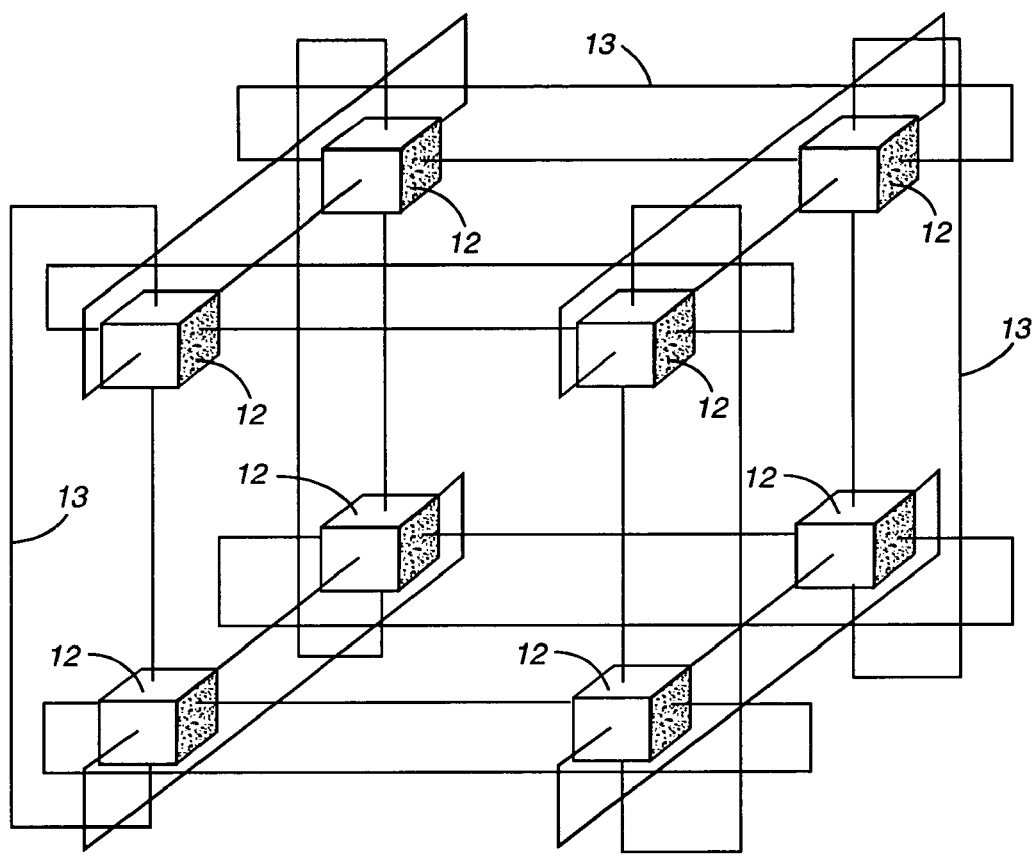
FIG. 9 depicts a small portion of a three-dimensional torus geometry interconnecting 8 computing nodes out of a typical base torus configuration of 512 computing nodes, upon which the present invention has been shown to be used advantageously.

The Blue Gene/L supercomputer consists of a number of nodes (which must be a power of 2) connected by a three-dimensional network. The three dimensional network is a torus if the number of nodes exceeds 512 nodes. For node numbers less than 512, the network is a mesh. FIG. 9 depicts a small portion 10 of a three-dimensional torus geometry interconnecting 8 computing nodes out of a typical base torus configuration of 512 computing nodes, upon which the present invention has been shown to be used advantageously.

Figure 10:
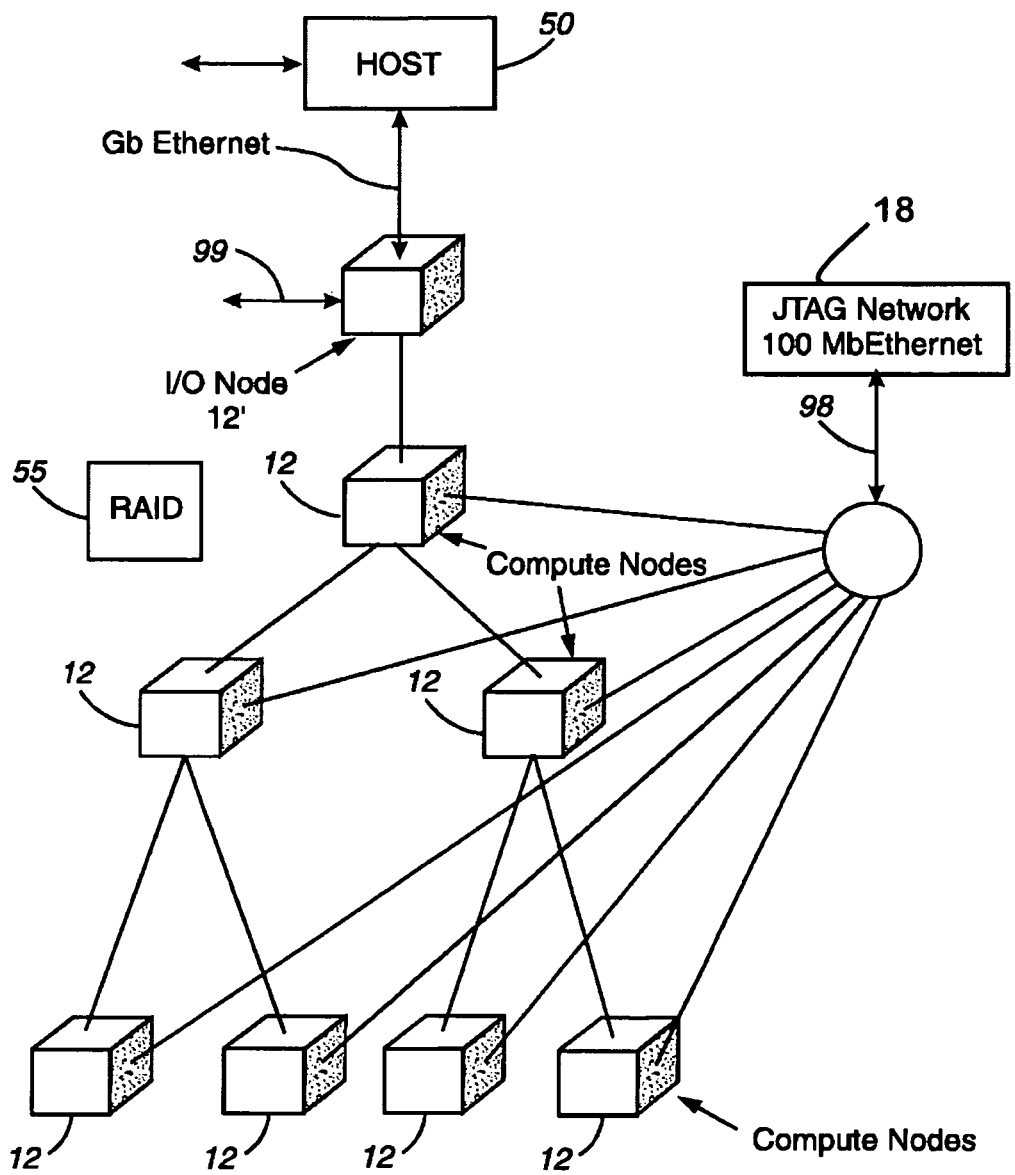
FIG. 10 illustrates a global combining tree network including global signals and external network connections according to the invention

As shown in FIGS. 9 and 10, for the torus network, each node 12 is connected to its six neighbors by bi-directional torus link 13 It is understood however, that other architectures comprising more processing nodes in different torus configurations (e.g., torus' in 4 or more dimensions) are contemplated including those described in commonly-owned, co-pending U.S. patent application Ser. No. 10/468,993 (Publication Number US 2004/0103218) entitled "Novel Massively Parallel Supercomputer"

Additionally, the torus provides for automatic multi-cast using "Class Routing" techniques where a single packet injected into the network can be deposited at multiple destinations. Preferably, the network is deadlock free by employing two dynamic Virtual Circuits plus two escape "Bubble" circuits for deadlock avoidance. While Torus networks have been used before, as described in herein incorporated, commonly owned, co-pending U.S. patent application Ser. No. 10/469,001 entitled "Optimized Scalable Network Switch", novel arbitration policies are used to achieve low latency and high throughput in massively scalable systems. A Point-to-Point token-based flow-control most effectively utilizes network buffering while distributing traffic away from hot spots. Guaranteed reliable delivery of packets is further enabled in the torus by employing separate CRC Error Detection on the headers, and full packet CRC error detection for automatic retransmission of corrupted network packets.

With respect to the Global Tree network, one primary functionality is to support global broadcast (down-tree) and global reduce (up-tree) operations. Additional functionality is provided to support programmable point-to-point or sub-tree messaging used for input/output, program load, system management, parallel job monitoring and debug. This functionality enables "service" or input/output nodes to be isolated from the Torus so as not to interfere with parallel computation. That is, all nodes in the Torus may operate at the full computational rate, while service nodes off-load asynchronous external interactions. This ensures scalability and repeatability of the parallel computation since all nodes performing the computation operate at the full and consistent rate. Preferably, the global tree supports the execution of those mathematical functions implementing reduction-messaging operations. Preferably, the Global Tree network additionally supports multiple independent virtual channels, allowing multiple independent global operations to proceed simultaneously. The design is configurable and the ratio of computation nodes to service nodes is flexible depending on requirements of the parallel calculations. Alternate packaging strategies allow any ratio, including a machine comprised of all service or input/output nodes, as would be ideal for extremely data-intensive computations.

Three Dimensional Torus Network of Blue Gene/L As described with respect to FIG. 9, the physical machine architecture is related to a n-dimensional torus 10, which in the example embodiment, is a simple 3-dimensional nearest neighbor interconnect that is "wrapped" at the edges. All neighbors are equally distant, except for time-of-flight differences such as exist between different racks of Application Specific Integrated Circuit (ASICs), making code easy to write and optimize. The nearest neighbor links between nodes can simultaneously carry a message bandwidth in each direction of 1.4 Gb/s in an example embodiment. Each node supports 6 independent bi-directional nearest neighbor links with an aggregate bandwidth into and out of the node of 1.05 GB/s.

Global Combining Tree

FIG. 10 illustrates a second network, referred to as the global combining tree network 59, interconnecting compute nodes 12 in a tree structure and including global signals and external network connections according to the invention. Included in the tree is an associated I/O processing node 12' that is connected through the Global Combining Tree to a predetermined number of compute nodes 12. In the preferred embodiment as shown in FIG. 10, one I/O node 12' is dedicated to providing service and I/O operations for 64 compute nodes 12. It should be understood that this ratio of I/O nodes to computer nodes is configurable to optimize physical packaging of the supercomputer. That is, the packaging design enables alternate configurations such that the ratio of computation nodes to service nodes may change depending on requirements of the parallel calculations. In a preferred embodiment, packaging technology supports ratios from 256:1 to 8:1. Alternate packaging strategies allow any ratio, including a machine comprised of all service or input/output nodes, as would be ideal for extremely data-intensive computations.

As shown in FIG. 10, the 100 Mb/s Ethernet network 98 connects both the compute nodes 12 and associated I/O node 12' into a large network, e.g., via network switch 18. As described in greater detail in herein-incorporated, commonly owned, co-pending U.S. patent application Ser. No. 10/469,003 (YOR920020040US1 (115278)) entitled "Ethernet Addressing Via Physical Location for Massively Parallel Systems", each node ASIC has a unique MAC address which allows a host system 50 to communicate to every node. The TCP/IP address associated with this MAC address contained the encoded geometric location of the node in the supercomputing machine. Thus, for example a diagnostic report from a faulty node can be traced directly through its TCP/IP address to the row and column of its rack, and its location within the rack of the supercomputer. Coupled with the high-speed networks, there is provided the ability to freeze the state of all nodes in the machine simultaneously. As one embodiment of the supercomputer comprises 81,920 compute nodes plus 1,280 input/output nodes, this provides unprecedented levels of diagnostics, debugging and inspection.

When functioning as I/O nodes 12', the ASIC not shown includes a Gigabit Ethernet 99 or like interface such as Infiniband, that may be used to access a large RAID disk system 55 that act as local disks to the nodes. The RAID system 55 is duplexed for redundancy and connected through switches (not shown) to the system through 1024 channels of Gigabit Ethernet 99 or Infiniband. The switches also interface to the host, allowing the host to access either the system nodes or to the RAID disk system through simple Ethernet I/P transactions. Inside the machine, dedicated I/O processors, which are ASICs with additional external memory, terminate the Gigabit Ethernet/Infiniband connection. Any I/O node can read or write the RAID disk at full gigabit speed. In the example embodiment described, the 64 k nodes of the system are configured to have a peak aggregate I/O bandwidth to disk or host of over 1 terabit per second.

Preferably, this binary-like combining tree 59 may extend over the entire supercomputer machine, allowing data to be sent from any node 12 to all others (broadcast), or a subset of nodes 12, with low latency. It is understood that the tree may have more than 3 ports (3 ports means binary (2 in, 1 out)). Just like in the torus, higher degree trees, i.e., 4-, 5- or 6-D, allows shorter and lower latency paths at the expense of more chip-to-chip connections and significantly higher cabling costs. Lower dimensions give longer latency and fewer chip-to-chip communications. Message passing is supported on the global combining tree 59, and controlled by either of the processors within each ASIC, allowing intensive operations like all-to-all communication to proceed independent of the compute nodes. Every branch of this tree has a preferred target bandwidth of 1.4 GB/s, or 2 bytes per processor cycle, in both the transmit and receive directions.

The hardware functionality built into the tree 59 is integer addition, subtraction, maximum, minimum, bitwise AND, OR, XOR, and broadcast. The functions are implemented in the lowest latency possible manner. For example, the addition function results in the lowest byte of the word being sent first on the global network. This low byte is immediately added to the other bytes (in hardware) from the other sources with the result being shifted out to the next level of the tree. In this way, a 64-bit word has already progressed up several layers of the tree before the high order byte is shifted out. This results in the possibility for a very low latency addition over the entire machine. This low latency addition is critical for iterative sparse linear equation solving techniques that require a global inner product.

The same tree may be utilized for global broadcast of data rather than shipping it around in rings. For communications from one-to-all this is a tremendous improvement, from a software point of view, over the nearest neighbor 3D link network. The broadcast functionality is also very useful when there are one-to-all transfers that need to be concurrent with communications over the 3D link network. A broadcast may also be handled over the 3D link network.

Finally, a global floating point-sum over the entire machine may be performed in a few microseconds by utilizing the binary tree two times. The first time the maximum of all the exponents is obtained and the second time the entire shifted integer numbers are added in global operations. Further details regarding the implementation of arithmetic functions over the torus may be found in herein-incorporated, commonly owned, co-pending U.S. patent application Ser. No. 10/468,991 (YOR920020031 US1, YOR920020032US1 (15258)) entitled "Arithmetic Functions in Torus and Tree Networks". Further details regarding the operation of the global combining tree network, particularly with respect to functionality supporting programmable point-to-point or sub-tree messaging used for input/output, program load, system management, parallel job monitoring and debug can be found in herein-incorporated, commonly-owned, co-pending U.S. patent application Ser. No. 10/469,000 (YOR8-2001-1005, YOR920020028US1 (15271)) entitled "A Global Tree Network for Computing Structures".

Exemplary Hardware Embodiment of Supercomputer

The supercomputer nodes typically have 512 MB of memory and two CPUs, each capable of a peak performance of 2.8 Gflops. Thus, the peak performance of the node is 5.6 or 2.8 Gflops/s depending on whether the CPUs are both used for computation or one is used for computation and the other for communication. Each compute node has six torus links built in, which are connected to its six nearest neighbors in the +x, −x, +y, −y, +z, −z directions respectively so that there is one hop between nearest neighbors. The links on the torus have a peak bandwidth of 1.4 Gb/s. Each node can communicate with its neighbors at the rate of 1.4 Gb/s in each direction.

In one embodiment of the present invention an application consists of a number of domains. The domains do computations before accessing information from other domains followed by more computations and so on. The amount of data exchanged between domains defines the communication traffic. In this embodiment one or more domains are mapped to a single supercomputer node. The present invention provides an optimal mapping of the domains to supercomputer nodes such that the communication time is minimized. Note that the definition of 'domain' depends on how the communication data is collected. In the examples used in the present invention, the data was obtained from runs of the MPI based applications code on supercomputer and so the domain was an MPI task. However, a domain might just as well be a single variable or collection of variables. The data could also be collected at runtime if the code is used for dynamic load balancing. In this case a domain could be a process or system thread.

In one embodiment of the presenting invention, an assumption is made that computation time is uniform across processors, and that our cost function needs only to minimize communication time. It is important to note in another embodiment, that the computation time can vary across processors in another embodiment, which is within the true scope and spirit of the present invention. Note that the information necessary as input in the present invention can be obtained from the Runtime System (RTS) during the execution of an application or can be provided as data from a prior test run.

Overview of Mapping

Assume a problem is given with D domains, which are to be mapped to a supercomputer computer with L×M×N nodes. Let C(i, j) be the amount of data communicated from domain i to domain j and let H(i,j) be the cost per unit of data for communication between domain i and domain j. C(i, j) is fixed by the underlying application and remains unchanged and constant throughout the optimization process. H(i,j), on the other hand, is directly dependent on the specific mapping of domains to nodes at any given step in the optimization and changes constantly depending on link utilization. For simplicity, in this embodiment assume that H(i,j) depends only on the distance between the nodes to which domains i and j are mapped, and is independent of the actual amount of data to be transmitted.

On supercomputer, nodes are arranged in a 3-D lattice and connect only to their six nearest neighbors through the torus interconnect. Each node in the lattice is labeled by its (integer) Cartesian coordinates (x, y, z) within the lattice. On this interconnected lattice, the simplest choice for the H(i,j) is to set it equal to the number of hops in the minimum path on the torus connecting node i to node j.

With this definition, the cost function in the present invention to minimize is given by, $$F = \sum_{i,j} C(i,j) H(i,j) \quad (1)$$

In the following, the terminology of Simulated Annealing and call F the Free Energy is adopted in the present invention.

For numerical work, it is helpful to normalize the Free Energy so that it is constrained to a fixed range. On the 3-D supercomputer torus, each node has 6 nearest neighbors (distance 1 hop), 18 next nearest neighbors (distance 2 hops), etc. The Free Energy F is a sum over all domains i of a term $\Sigma_j C(i,j)H(i,j)$. The minimum achievable value for each of these individual terms is obtained if the domains j are "dealt out" in order of decreasing value of C(i j) first to the same node as domain i, then to i's nearest neighbors, then to i's next to nearest neighbors etc. The minimum achievable value for the total Free Energy is then given by the sum over domains of each of these individual domain minimum values. This minimum Free Energy is denoted by $F_{min}$. In most cases (and particularly for non trivial patterns), it is not possible to achieve this minimum value. Nevertheless, it is a useful concept for normalization and as an idealized "theoretical" lower bound.

The general optimization method in the present invention is Simulated Annealing (SA) as in "Simulated Annealing: Theory and Applications (Mathematics and Its Applications, 37)", R J. M. Van Laarhoven, E. H. L Aarts, P. J. M. Van Laarhoven, D Reidel Pub Co, September 1987 (ISBN: 9027725136). SA is an iterative method, which repeatedly attempts to improve a given configuration by making random changes. To seed the process, an initial configuration must be set up. In one embodiment, the following method is adopted as a good starting configuration, and it should be understood that many other suitable approaches for a starting configuration are possible.

Define the function c(i) as $$c(i) = \sum_j C(i,j) \quad (2)$$

c(i) is the total data communicated by domain i. By a simple reordering, the domains are arranged as labeled such that $c(1) \geq c(2) \geq c(3)$. The processors of supercomputer are determined by their Cartesian coordinates (x, y, z). Let, p=D/(L M N)) be the number of domains mapped to each supercomputer node on average. Let n(x, y, z) be the number of domains mapped to node (x, y, z). For compute load balancing, in this embodiment n is restricted to be close to p. The tightest constraint is to require that, $$\text{Int}(p) \leq n(x,y,z) \leq \text{Int}(p+1) \quad (4)$$

where Int(p) is the integer part of p.

An initial heuristic map is defined by the following algorithm:

1. Map domain i=1 to an arbitrary location (x, y, z).
2. Map all domains with which domain i 1 communicates either to location (x, y, z) or to its neighboring locations on the supercomputer torus while satisfying the constraint of Equation 4.
3. Next, map domain i=2 (if it is not yet mapped) to an arbitrary location (x, y, z) and the domains with which it communicates either to the same node or to a neighboring node on the torus while satisfying the constraint of Equation 4.
4. Repeat this last step for i=3, 4, ..., D.

Starting from this heuristic map, a Simulated Annealing is preformed to find a minimum of the Free Energy, F. To this end, define a Markov Chain of mappings ('Markov Chains' by Pierre Bremaud, Springer Verlag, 1999 (ISBN: 0387985093), which is hereby incorporated by reference in its entirety.) $\{M_i, i=0, 1, 2, \ldots, n\}$ where $M_0$ is the heuristic map and $M_i$ is derived from $M_{i-1}$ by applying the following algorithm (called the Metropolis Algorithm as described in "Markov Chain Monte Carlo in Practice", W. R. Gilks, S. Richardson, D. J. Spiegelhalter (eds), Boca Raton Fla.: Chapman and Hall, 1996 (ISBN: 0412055511); 'Introduction to the Monte Carlo Method', I. Manno, Budapest, Hungary, 1999 (ISBN: 9630576155), which is hereby incorporated by reference in its entirety.):

1. Introduce a new parameter β which is at inverse temperature (β=1/T), and initially set β to some small value.
2. Generate a candidate new map $M^N_i$ from $M_{i-1}$ by either swapping two domains between randomly chosen locations on the torus or, by moving a domain from a random location on the torus to another, provided this does not violate Equation 4.
3. Accept $M^N_i$, i.e. set $M_i = M^N_i$ iff, $R < \exp[-\beta\{F(M^N_i) - F(M)_{i-1}\}/F_{min}]$ where R is a random number uniformly distributed in (0, 1). (5)

4. Continue to generate new candidate mappings using the same β value until the Free Energy decreases to a stable equilibrium.

5. Now, in steps, increase β and continue the Markov chain process until, for each new β a new Free Energy equilibrium is reached.

This procedure is called Simulated Annealing because it is analogous to the annealing process in metallurgy, where metals are first heated and then slowly cooled to remove impurities. Note also the normalization used for the Free Energy factors into Equation 5. This normalization is helpful computationally

Application Example Mapped Using Present Invention

As a simple example to test these methods, consider a problem that has $8^3$ domains on a regular 3-D torus, were each domain communicates a fixed amount of data to its six nearest neighbors. In this example, this problem is mapped onto an $8^3$ supercomputer torus. The problem is small, simple, with an optimum map that is obvious. And yet, it is complex and large enough to be a useful test of the methods as described by the present invention.

FIG. 1 is a plot of a structure of the communications matrix C (i, j) for an exemplary problem solved according to the present invention. The horizontal axis specifies the Sender's id, i. The vertical axis specifies the Receiver's id, j. Non-zero entries in this matrix are shown as crosses. The main adjustable parameters in the method are the values of β which are used, and the number of iterations which are executed for any given value of β.

For the method to be successful, it is important to ensure that the acceptance rate for moves is not too low. A low acceptance rate signals that the mapping is not changing from one step to the next. A reasonable range for the acceptance rate is 10%-50%. Recall from Equation 5 that the acceptance rate is governed by the condition that a random number is less than the exponential of the change in the normalized Free Energy $(F/F_{min})$ times β. By construction, F/F min≧1, but for a good mapping F/F min is expected to be close to one in value. Typical values for β are then in the range $1 \leq β < 10$. With these ranges the argument of the exponential is typically less than O(10), and reasonable acceptance rates can be achieved for the Metropolis step.

To determine the number of iterations to execute for a given value of β, it is sufficient to monitor the behavior of the Free Energy function as the annealing proceeds. Typically this drops quickly for a time and then plateaus. The plateau signals the onset of equilibrium for the given value of β, and it is usual to switch to a new β once the plateau has been clearly established for a given β.

Figure 2:
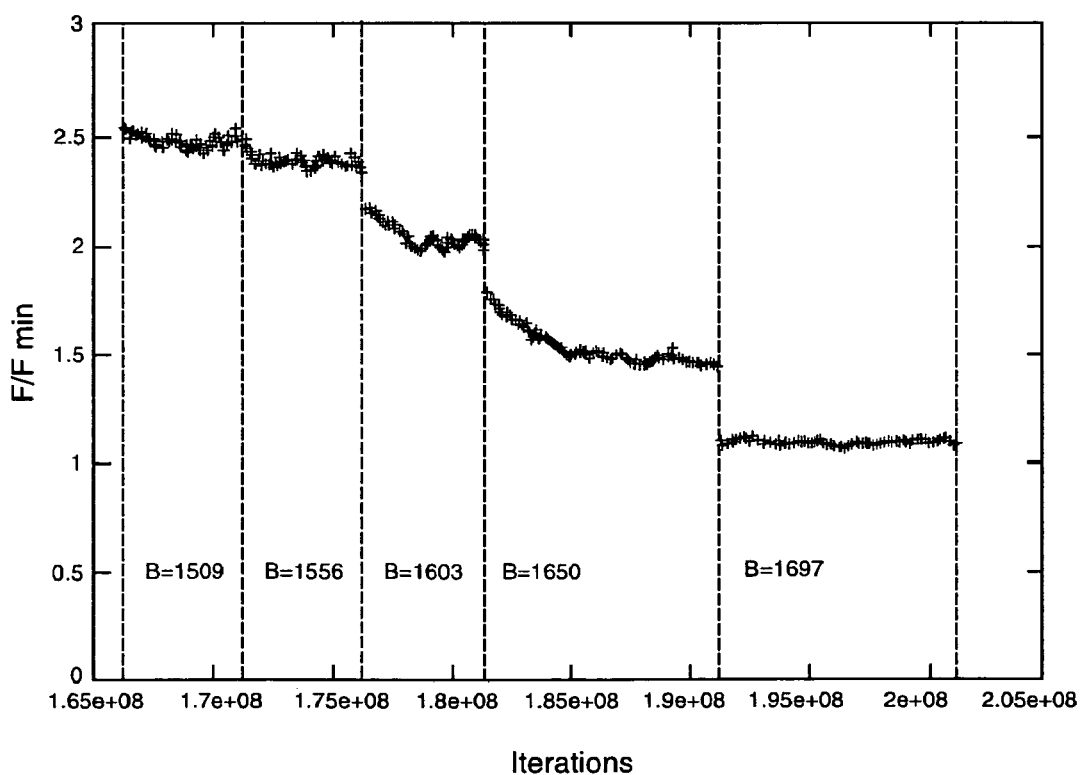
FIG. 2 is a plot illustrating the evolution of the normalized Free Energy for an example run of the Simulated Annealing algorithm according to the present invention.
Figure 3:
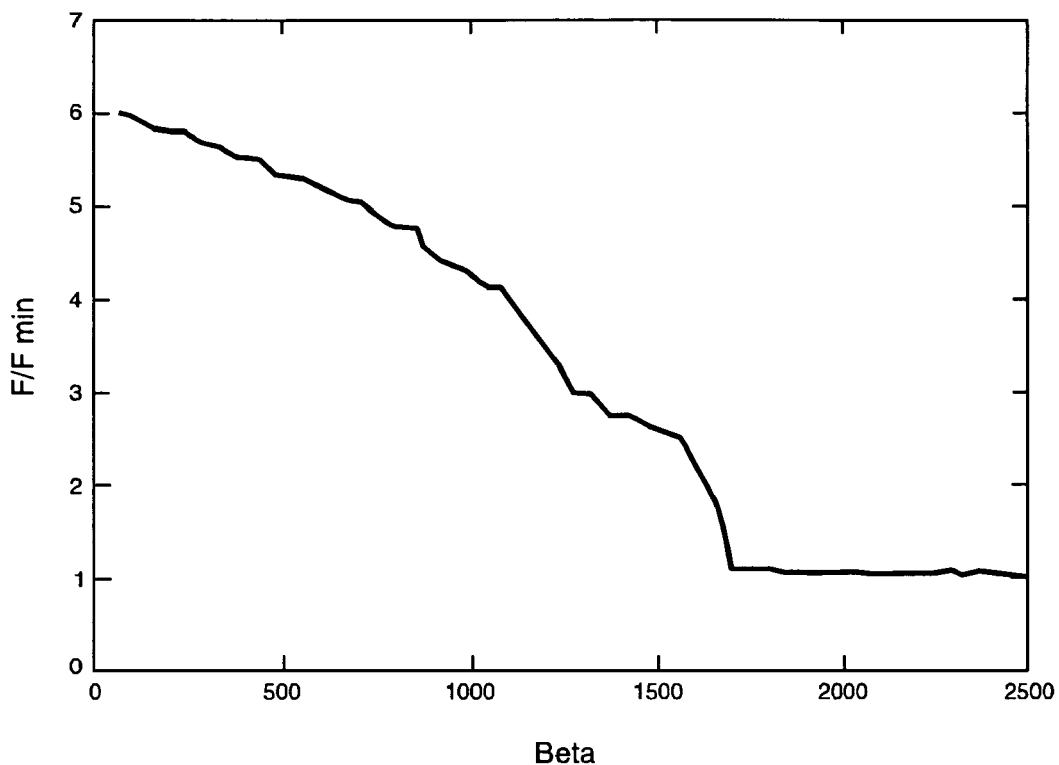
FIG. 3 is a plot of the values of normalized Free Energy achieved at the tail end of each fixed/3 segment for the same run, according to the present invention.

FIG. 2 is a plot illustrating the evolution of the normalized Free Energy for an example run of the Simulated Annealing algorithm according to the present invention. The normalized Free Energy as a function of iteration. The vertical dividers on this plot define the point at which β is increased. Within each fixed β band, the Free Energy initially falls and then plateaus. As one moves left to right between bans, β increases and the Free Energy equilibrium or plateau value decreases. Early in the simulation, convergence is slow and plateaus are not really distinguishable. For the last β change shown, convergence occurs very quickly. This type of convergence profile is quite common in annealing. FIG. 3 is a plot of the values of normalized Free Energy achieved at the tail end of each fixed β segment for the same run, according to the present invention. The converged plateau value of the Free Enger achieve as a function of β. For this problem the Free Energy converges to the ideal minimum value of 1 as β increases beyond a certain value. The resulting layout is optimal mapping of domains to the BG/L torus for a 3-D nearest neighbor problem. In both figures observe that the value of the normalized Free Energy falls steadily and eventually achieves the ideal value 1. Inspection of the mapping of domains to nodes for this final achieved configuration shows that it corresponds to the ideal where domains are mapped to the torus in a manner where only nearest neighbor communication is required.

Embodiment of an Enhancement to the Present Invention

The previous section entitled "Application Example Mapped Using Present Invention" has demonstrated that at least in simple cases, Simulated Annealing can be used to find a good mapping of problem domains to supercomputer compute nodes. However the simple implementation described in the previous section does not scale sufficiently well to be used on a full size supercomputer system, which could contain up to 65336 compute nodes. Compute times for the simple implementation are already hours long for optimization of layouts on $O(10^3)$ processors and would become prohibitive for the full supercomputer machine.

However, the annealing method is very robust and admits almost infinite variation. In this embodiment a divide-and-conquer approach is described which has been advantageously implemented with the present invention, which allows a fast generation of slightly sub-optimal mappings. This approach can be used to generate very good mappings. In our examples, the final maps are quite close to the optimum map found by full Simulated Annealing and much better than the default MPI rank order mapping.

For many parallel applications, the communication matrix C(i, j) is sparse. In most cases problem domains communicate with nearby domains, with relatively infrequent, or small, communications with distant domains. This suggests that the map of problem domains to nodes might be constructed one domain at a time. The advantages of such an approach are clear. For an n node system, the possible mappings which have to be searched for an optimum layout are O (n!). It is clearly more efficient to optimize k maps of size n/k than one map of size n. Of course, in general, the Free Energy minimum, which will result from a divide-and-conquer approach, will not be optimum because the search space over which the optimization is done is truncated.

The divide-and-conquer approach, which has been shown to be used advantageously with the present invention, proceeds as follows. First a graph, C(V, E) is constructed in which each vertex v∈V represents a problem domain.

Two vertices i, j are joined by an edge $e_{ij} \in E$ if C(i, j)>0. Each edge is assigned a weight C(i,j). A subgraph S ($V_S$, $E_S$) of G consists of a subset $V_S$ of V and a subset $E_S$ of E where $\forall e_{ij} \in E_S$, i, j∈$V_S$.

The communications graph G is now divided into subgraphs so as to minimize communications between subgraphs. One package shown to work advantageously with the present invention is a public domain package called METIS see for online URL (http://www-users.cs.umn.edu/karypis/metis/) which is hereby incorporated by reference in its entirety. for this partitioning. METIS is the standard tool in graph partitioning. It attempts to produce balanced partitions that minimize the edge cut of the partitions. The edge cut is the sum of the weights of all edges that link vertices belonging to different partitions. This partitioning scheme permits the identification of groups of problem domains that are maximally independent from each other, and so can be independently assigned to compute nodes with minimal interference.

Having obtained a METIS partitioning, next the mapping proceeds sequentially to map one subgraph at a time to a set of nodes using the heuristic method defined in above in the section entitled "Overview of Mapping" and then use SA to optimize the subgraph maps one by one. At any given step, annealing is applied only to the subgraph being mapped. Those subgraphs that have been mapped previously are left unchanged. The first subgraph to be mapped to the compute nodes is selected at random. Thereafter, the next subgraph to be mapped is chosen as the subgraph with the largest connectivity to subgraphs already mapped.

An important aspect of the process is the decision on the size of the individual partitions. Small partitions anneal quickly. However, large partitions are required to achieve the optimum or close-to-optimum mappings. In a subgraph S $(V_S, E_S)$ of G, the ratio $$l = \frac{\sum_{i,j \in V_S} C(i,j)}{\sum_{i \in V_S, j \in V} C(i,j)}$$

describes how connected the subgraph S is to the rest of the communications graph G. Constraining l would be the method normally used to control quality in a production implementation of annealing for mapping optimization. In this embodiment of the present invention, this approach is not adopted. Rather results for various partition sizes are shown. Typical execution times for optimization using small partitions (e.g. 8 nodes per partition, 128 partitions total) was 0(30) minutes. Typical execution times for optimization using large partitions (e.g. 256 nodes per partition, 4 partitions total) was 0(10) hours.

Exemplary Results of Mapping According to the Present Invention

As a test of these methods of the present invention, four separate communication problems are used.

1. Cubic 1: This is the 3-D nearest neighbor problem already discussed previously. There is one domain for each node on an 8×8×8 torus and the task is to lay them out on an 8×8×8 supercomputer torus. The communications pattern is that each domain sends equal sized packets to each of its six nearest neighbors on the torus. The exact (optimum) solution in this case is known so the results of the mapping from the current method can be compared with the optimum mapping.

2. Cubic 2: This problem is similar to the Cubic 1, but now domains send full sized packets to their six nearest neighbors (distance 1 hop) and half sized packets to their six next nearest neighbors (distance 2 hops) along the Cartesian directions of the torus. Packets are sent in straight lines only; no turns on the grid are included. Once again, the optimum map is known analytically.

3. SAGE: This is an Adaptive Grid Eulerian hydrodynamics application from Science Applications International Corporation as described in D. J. Kerbyson, H. J. Alme, A. Hoisie, F. Petrini, H. J. Wasserman, M. Gittings, "Predictive Performance and Scalability Modeling of a Large-Scale Application", Proceedings of the 2001 ACM/IEEE Conference on Supercomputing, which is hereby incorporated by reference in its entirety. In the example used here in this embodiment, only a simple case with the timing h input set is considered, which does heat conduction and hydrodynamics without adaptive mesh refinement. The communication pattern is complex enough that this case is useful by itself. The requirements of the full code (with AMR) would be similar—requiring one to find a mapping to the nodes every time the problem grid is redefined. The main points of the analysis are the same in the full code, and our methods would also apply in this case.

SAGE uses a regular Cartesian grid, where cells are grouped into blocks, with each block containing 8 cells in a 2×2×2 configuration. Blocks are distributed in (x, y, z) order. For scaling purposes, a constant number of cells per task are used. With the simplest input set, the global domain is a cube. For small task counts, the decomposition strategy results in something close to a slab decomposition of the global domain. The precise shape of the local domain depends on the number of cells per task and on the number of tasks. Algorithm 1 is given below.

Input:

T, the set of compute nodes in the supercomputer torus network

The full unpartitioned Graph G(V, E)

A subgraph $S(V_S, E_S)$ of G.

$P \subset V$ where p∈P are vertices already mapped to compute nodes in T.

A mapping M: P←T

L, a limit on subdivisions

Output:

Updates M to include mappings from $V_S$ to T Updates P to include $V_S$.

(1) Use METIS to divide S into $S_1(V_1, E_1)$ and $S_2(V_2, E_2)$.

$$l_1 \leftarrow \frac{\sum_{i,j \in V_1} C(i,j)}{\sum_{i \in V_1, j \in V} C(i,j)}, \quad l_2 \leftarrow \frac{\sum_{i,j \in V_2} C(i,j)}{\sum_{i \in V_2, j \in V} C(i,j)}$$

(3) if $l_1$<L or $l_2$<L (4) Assign each v∈$V_S$ to a node t∈T using Simulated Annealing.

(5) Update P: P←P∪$V_S$ (6) Update M to include the mappings from $V_S$ to T.

(7) else (8) $c_1 \leftarrow \Sigma_t \in V_{i,j} \in PC(i,j)$ (9) $c_2 \leftarrow \Sigma_t \in V_{2,j} \in PC(i,j)$

(10) if $c_1 > c_2$ (11) Partition (T, G, $S_1$, P, M, L)

(12) Partition (T, G, $S_2$, P, M, L)

(13) else

(14) Partition (T, G, $S_2$, P, M, L) (15) Partition (T, G, $S_1$, P, M, L)

(16) return M

Algorithm 1 above: Partition. This algorithm recursively bisects a graph until the subgraphs are small enough to be mapped to the Torus using Simulated Annealing.

4. UMT2000: This is an ASCI Purple Benchmark, which solves a photon transport problem on an unstructured mesh as in ASCI Purple Benchmark Web page: available at online URL (http://www.llnl.gov/asci/purple/benchmarks/limited/umt), which is hereby incorporated by reference in its entirety. The application is written in Fortran-90 using MPI and optionally OpenMP. The unstructured mesh is statically partitioned in the code using the METIS Library. There is a significant spread in the amount of computational work per task so this code can have a serious compute load imbalance. However, in this embodiment only the communication imbalance is addressed which is also equally significant.

Figure 4:
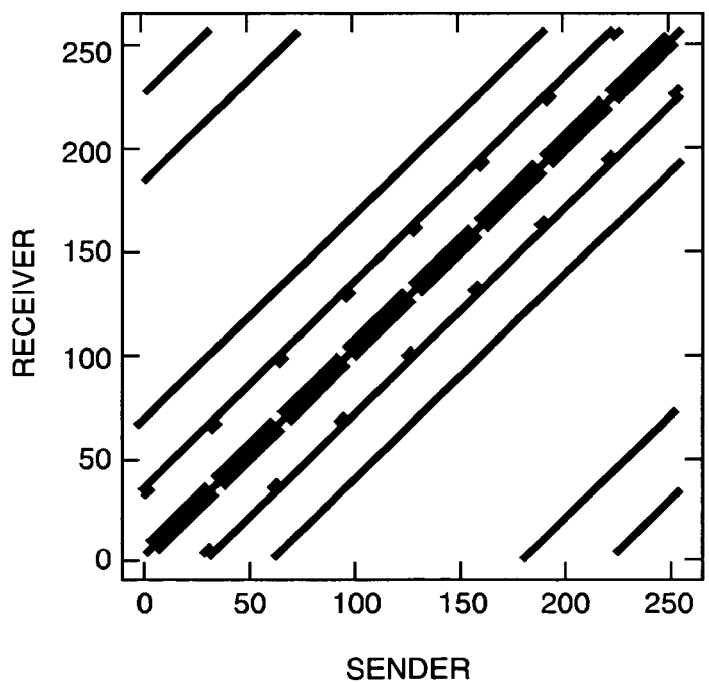
FIGS. 4, 5 and 6 are the communication maps for the Cubic, SAGE and UMT2000 software applications respectively for an 8×8×8 problem, however it is important to note that. these are merely illustrative examples of the input maps that can be implemented on an arbitrary computer network using the present invention.
Figure 5:
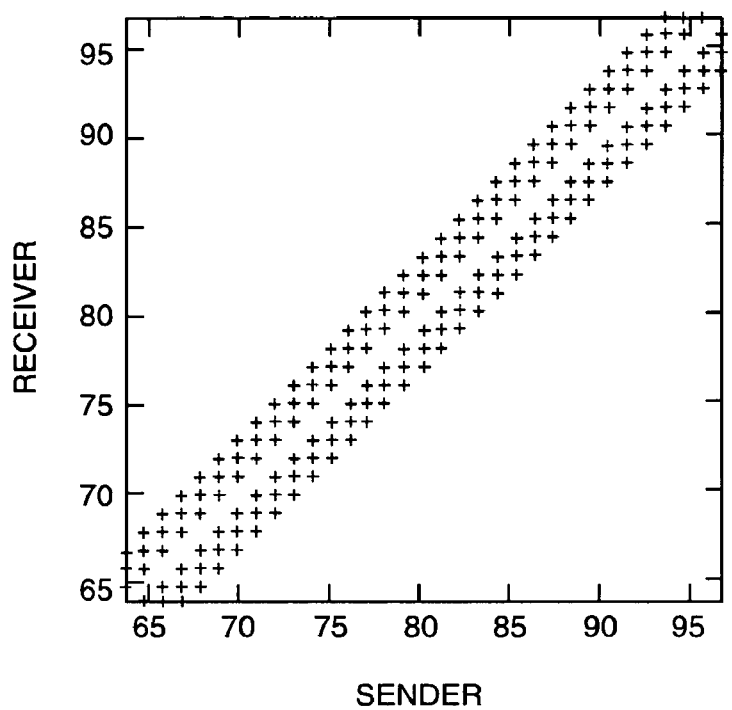
Figure 6:
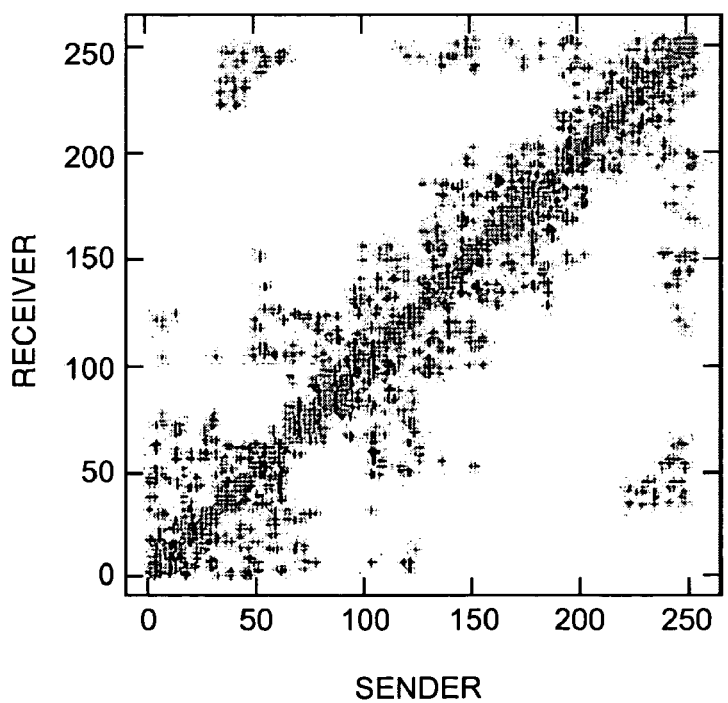

The communications patterns for the Cubic 2, SAGE and UMT2000 are shown in FIGS. 4, 5 and 6. The Cubic and SAGE cases have regular communications patterns. UMT2000 has an irregular pattern. In FIG. 4, the communication pattern for the Cubic 2 problem is on a 8×8×8 torus. In FIG. 5, the communication pattern for SAGE is on a 8×8×8 grid. SAGE has an extremely regular communications pattern where nodes only communicate with their MPI rand order neighbor and only a subset of the full pattern is shown.

Tables 1, 2 and 3 gives the optimization results for various grid sizes and Simulated Annealing variants for each of the test cases studied.

Figure 7:
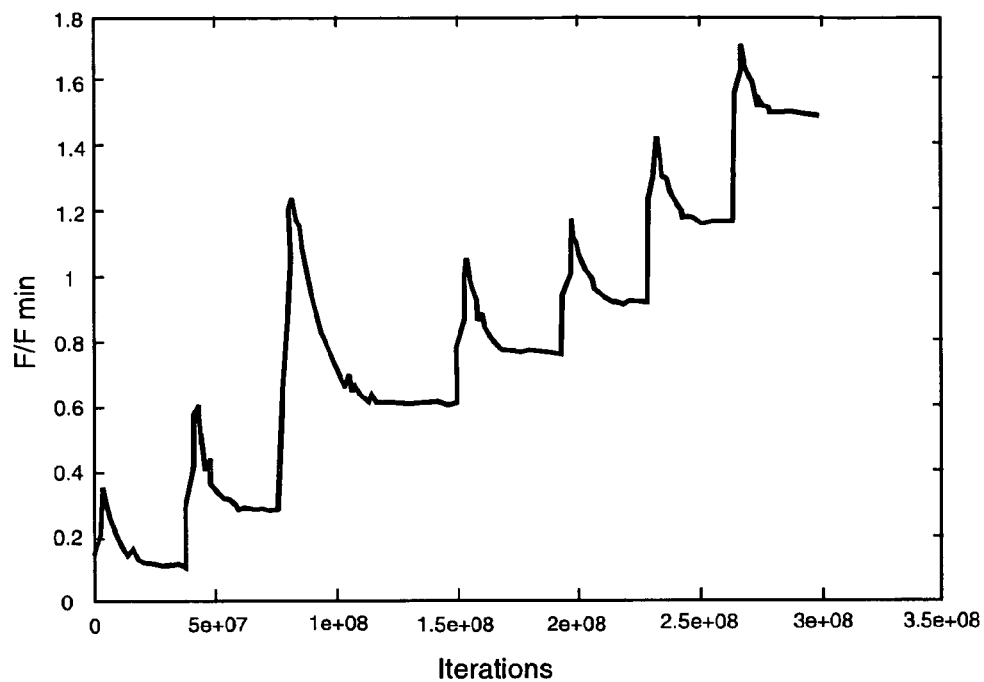
FIG. 7 is a plot illustrating a typical convergence curve, generated by the divide and conquer approach, according to the present invention.

In this table, "ideal" denotes the ideal "theoretical" value for the Free Energy discussed before. "Heuristic" is the value achieved when the heuristic placement algorithm of Section 3 is used. "MPI rank order" is the value achieved when domains are placed in MPI rank order. "Random" is the average value achieved for 100 random placements of domains onto the supercomputer torus. The "ideal" and "random" cases provide lower and upper bounds respectively for the normalized Free Energy. Finally, the "sa n" entries provide the results achieved for the divide and conquer variant in which the domains are divided into it sub-domains using METIS, and placement of each of these sub-domains are successively optimized until the full problem has been mapped. In this variant, the "sa 1" case represents a full Simulated Annealing run with one partition containing all nodes. FIG. 7 is a plot illustrating a typical convergence curve generated by the divide and conquer approach.

FIG. 11 is Table 1 which illustrates the method succeeds with the Cubic 1 and Cubic 2 maps, where as expected, it finds the known optimal map. These are 3-D problems and are chosen because the ideal mapping case is straightforward to identify. The ideal mapping case has a normalized Free Energy of 1. The heuristic, MPI rank order and random cases provide reference values for the Free Energy values which can be achieved by various placement strategies described in the present invention. For these problem, the annealing was attempted only with a single partition (sa 1) containing all the nodes which generated the optimum layout with Normalized Free Energy equal to 1 (exact solution).

Continuing to FIG. 12 shown is Table 2 illustrating the optimization results for UMT2000, the improvement in the cost function over the default map (MPI rank order) is by about a factor of 1.66 for both 256 and 1024 tasks. In FIG. 13, Table 3 illustrates the improvement results achieved for SAGE. This improvement over the default MPI layout is factor of about 1.52 and 2.45 for 256 and 2048 MPI tasks. FIG. 14 is Table 4, which illustrates the communication time results for a 512 processor SAGE run using several different maps. The cost and time of the MPI rank order map is used to normalize the coast and communication times respectively. These are quite significant effects and lead to improved communication performance as is illustrated in the next section entitled "Measured Communication Costs For Maps." Experiments using the present invention will undoubtedly show that the improvements for larger task counts will be equal or better.

Measured Communication Costs for Maps

Thus far discussed are the improvements in Free Energy value. Presented now are the results showing the variation in measured communication times when different mappings are used. An application was run on the supercomputer hardware using a variety of mappings. The runtime for each mapping was recorded, and more importantly, the time the application spent in MPI point-to-point communications was measured.

In this embodiment SAGE is used on a 512 node partition as the most appropriate application, since it is more communication bound than UMT2000.

The mappings were created using the methods discussed above. In addition, the best-known handcrafted map was used. The costs and times associated with MPI rank order are used as normalization constants.

Figure 8:
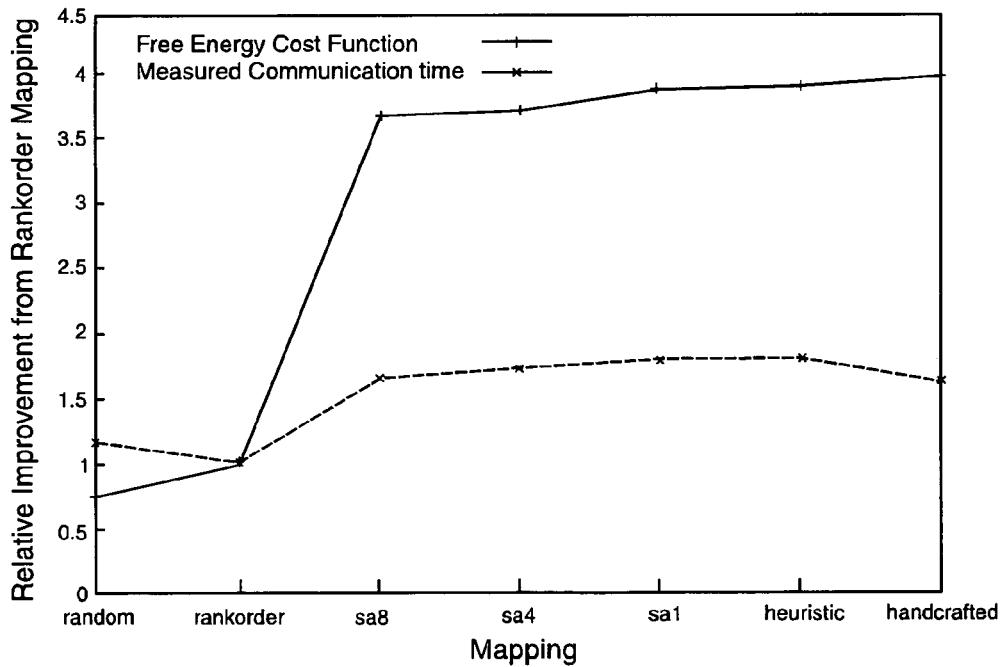
FIG. 8 is a plot of the improvement factor in cost function and actual runtime communication time for the mappings, according to the present invention for the application SAGE.

FIG. 8 is a plot of the improvement factor in cost function and communication time for the mappings. Referring back to Table 4 of FIG. 14, shown is the costs and communication times relative to the default MPI rank-ordering map. The results are interesting. The best mapping, created by a single partition Simulated Annealing run shows a factor of 1.79 improvement over the default MPI rank ordered map. The heuristic method and the four-partition Simulated Annealing run also show improvements by a factor of over 1.7. In addition all of the Simulated Annealing runs and the heuristic method generate maps with lower communication times than the handcrafted map. The mapping discovered using our method is better in actual run time performance than the hand crafted mapping (which shows an improvement only of a factor of 1.593 over MPI rank order.) The reason why there is not a perfect match between the cost function and runtime is that the cost function does not fully model the communication patterns or network behavior (this would be prohibitively expensive).

OTHER EMBODIMENTS AND CONCLUSION

On the optimization cases tested in the present invention, shown is that the Simulated Annealing method produces good mappings and has the potential to be used as a general layout optimization tool for parallel codes. The serial code developed so far can easily be implemented in MPI. The code could also be written so that when an application runs using a default mapping, the run time system makes an analysis of the communication traffic and at the end of the run, makes an analysis to suggest an improved map for use in subsequent runs. The user would then be given the option to use a run time flag to use the optimized map instead of the default MPI rank order map for subsequent runs.

If the method described here is practically useful, (leads to performance gains across a spectrum of real applications), it would be particularly useful for applications that are expected to run repeatedly for the same problem sizes after an optimum layout is discovered. The method might even be useful as an initialization step in mapping an unknown problem to supercomputer. It could also find use in problems which use Automatic Mesh Refinement (such as some weather modeling codes, SAGE, aircraft simulation codes etc).

For the purpose of illustration, the embodiments of the present invention discussed point-to-point communications and optimizations involving the torus network of the BG/L supercomputer. However, it will be understood to those of average skill in the art that collective communications, which use the global tree network, and compute load imbalance between domains (if they exists in the application) are included in the analysis by modifying the cost function appropriately, within in true scope and spirit of the present invention.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A computer-implemented method to optimize an allocation of a software application across two or more parallel computational nodes on a parallel-processing system, the computer-implemented method comprising:

receiving a communications profile of a software application comprising a plurality of software computations i for execution across two or more parallel computational nodes j on a parallel-processing system coupled together by a communications fabric, wherein at least a first software computation of the plurality of software computations communicates application data from at least a second software application of the plurality of software computations i, and wherein the communications profile includes an amount of software application data communicated between each of the software computations given by $C(i, j)$;

implementing, from the communications profile of the software application which has been received, an initial heuristic map defined by mapping each of the software computations i, in a domain D of all the software computation i on a given computational node, for i=1 to D by iteratively performing until i=D the following:

mapping one of the software computations i=1 to one of the computational nodes j at a first arbitrary location of a node (x, y, z);

mapping all domains with which domain i communicates either to the one of the computational nodes j at the initial location of the node (x, y, z) or to one of the computational nodes j in a neighboring location on the parallel processing system while satisfying the constraint of $Int(p) \leq n(x, y, z) \leq Int(p+1)$, wherein n(x, y, z) is a number of domains mapped to the node (x, y, z), wherein D domains, which are to be mapped to a supercomputer computer with a number of nodes L×M×N, where p=D/(L×M×N)) be the number of domains mapped to each supercomputer node on average, and wherein Int(p) is the integer part of p;

mapping domain i=2, in response to domain i=2 is not yet mapped, to one of the computational nodes i at a second arbitrary location of a node (x', y', z') and the domains with which it communicates either to a same computational node at the second arbitrary location of a node (x', y', z') or one of the computational nodes j in a neighboring location a neighboring computational node on the parallel processing system while satisfying the constraint of $Int(p) \leq n(x, y, z) \leq Int(p+1)$;

generating a Markov chain of maps from the initial heuristic map using Monte Carlo simulation with Free Energy given by $F=\Sigma_{i,j} C(i,j) H(i,j)$ where $H(i, j)$ is an inter-node cost communication function; and mathematically minimizing $H(i, j)$ using only the inter-node communication cost function for a total amount of software application data transferred between the parallel computational nodes j, wherein minimizing the inter-node communication cost minimizes inter-node communication time using simulated annealing, and wherein computation costs are uniform across the two or more parallel computational nodes j, wherein the total amount of software application data transferred between the parallel computational nodes i is minimized by at least one of a global time and a discrete time interval so as to reduce the inter-node communication cost of the software application, and the simulated annealing is performed by selecting a new candidate map $M^N_i$ from $M^N_{i-1}$, of a set of candidate maps $M_i = M^N_i$ when $R < \exp[-\beta\{F(M^N_i) - F(M_{i-1})\}/F_{min}]$, where R is a random number uniformly distributed in (0, 1) and where i is a non-negative integer and $M_o$ is the heuristic map and $M_i$ is derived from $M_{i-1}$ by applying a Metropolis Algorithm and β is the inverse temperature β=1/T, $F_{min}$ is a minimum calculated Free Energy, and new candidate mappings $M^N_i$ are generated using a same β value until the Free Energy decreases to a stable equilibrium.

2. The computer-implemented method according to claim 1, further comprising:

relocating at least on the software computations from one of a plurality of the parallel computational nodes j to another of the plurality of the parallel computational nodes j in response so as to mathematically minimize the cost function.

3. The computer-implemented method according to claim 1, wherein the receiving the communications profile of the software application includes receiving a heuristic map which sequentially maps each of the software computations to one of the parallel computational nodes j so that each of the software computations which communicates application data with a previously mapped node is mapped to a near-neighbor node defined as a node in closest proximity thereto.

4. The computer-implemented method according to claim 1, wherein the receiving the communications profile of the software application includes receiving a graph partition map which identifies software computations which are maximally independent as to an amount of software application data communicated there between.

5. The computer-implemented method according to claim 4, wherein the graph partition map includes using at least one algorithm to determine cliques and bicliques in a graph.

6. The computer-implemented method according to claim 4, wherein the graph partition map includes using a METIS tool.

7. The computer-implemented method according to claim 1, wherein the mathematically minimizing $H(i, j)$ the inter-node communication cost function includes minimizing number of hops on a torus between domain i and domain j and wherein the Markov chain is generated by moving a domain to one of an unoccupied and partially occupied node while maintaining computational load balance.

8. The computer-implemented method according to claim 1, wherein the receiving the communications profile of the software application includes receiving the communications profile on the parallel-processing system in which each node is arranged into a 3-D lattice with a torus communication network therebetween and wherein the mathematically minimizing $H(i, j)$ the inter-node communication cost function includes minimizing number of hops on a torus between domain i and domain j and wherein the Markov chain is generated by at least one of swapping domains between Blue Gene/L Supercomputer nodes.

9. The computer-implemented method according to claim 1, wherein the receiving the communications profile of the software application includes receiving the communications profile on the parallel-processing system which is a Blue Gene/L Supercomputer.

10. A non-transitory computer program product for optimizing an allocation of a software application across two or more parallel computational nodes on a parallel processing system transferring data between two application data structures, the computer program product comprising:

a computer readable storage medium readable by a processing circuit and storing computer instructions for execution by the processing circuit for performing a method comprising:

receiving a communications profile of a software application comprising a plurality of software computations i for execution across two or more parallel computational nodes j on a parallel-processing system coupled together by a communications fabric, wherein at least a first software computation of the plurality of software computations communicates application data from at least a second software application of the plurality of software computations i, and wherein the communications profile includes an amount of software application data communicated between each of the software computations given by $C(i, j)$;

implementing, from the communications profile of the software application which has been received, an initial heuristic map defined by mapping each of the software computations i, in a domain D of all the software computation i on a given computational node, for i=1 to D by iteratively performing until i=D the following:

mapping one of the software computations i=1 to one of the computational nodes j at a first arbitrary location of a node (x, y, z);

mapping all domains with which domain i communicates either to the one of the computational nodes j at the initial location of the node (x, y, z) or to one of the computational nodes j in a neighboring location on the parallel processing system while satisfying the constraint of $Int(p) \leq n(x, y, z) \leq Int(p+1)$, wherein $n(x, y, z)$ is a number of domains mapped to the node (x, y, z), wherein D domains, which are to be mapped to a supercomputer computer with a number of nodes L×M×N, where p=D/(L×M×N)) be the number of domains mapped to each supercomputer node on average, and wherein Int(p) is the integer part of p;

mapping domain i=2, in response to domain i=2 is not yet mapped, to one of the computational nodes i at a second arbitrary location (x', y', z') and the domains with which it communicates either to a same computational node at the second arbitrary location (x', y', z') or one of the computational nodes j in a neighboring location a neighboring computational node on the parallel processing system while satisfying the constraint of $Int(p) \leq n(x, y, z) \leq Int(p+1)$;

generating a Markov chain of maps from the initial heuristic map using Monte Carlo simulation with Free Energy given by $F = \Sigma i,j C(i,j) H(i,j)$ where $H(i,j)$ is an inter-node communication cost function; and mathematically minimizing $H(i, j)$ only the inter-node communication cost function for a total amount of software application data transferred between the parallel computational nodes j, wherein minimizing the inter-node communication cost minimizes inter-node communication time using simulated annealing, and wherein computation costs are uniform across the two or more parallel computational nodes j, wherein the total amount of software application data transferred between the parallel computational nodes i is minimized by at least one of a global time and a discrete time interval so as to reduce the inter-node communication cost of the software application, and the simulated annealing is performed by selecting a new candidate map $M^N_i$ from $M^N_{i-1}$, of a set of candidate maps $M_i = M^N_i$; when $R < \exp[-\beta\{F(M^N_i) - F(M_{i-1})\}/F_{min}]$, where R is a random number uniformly distributed in (0, 1) and where i is a nonnegative integer and $M_o$ is the heuristic map and $M_i$ is derived from $M_{i-1}$ by applying a Metropolis Algorithm and $\beta$ is the inverse temperature $\beta=1/T$, $F_{min}$ is a minimum calculated Free Energy and new candidate mappings $M^N_i$ are generated using a same $\beta$ value until the Free Energy decreases to a stable equilibrium.

11. The computer program product of claim 10, further comprising:

relocating at least on the software computations from one of the plurality of the parallel computational nodes j to another of the plurality of parallel computational nodes j in response so as to mathematically minimize the cost function.

12. The computer program product of claim 10, wherein the receiving the communications profile of the software application includes receiving a heuristic map which sequentially maps each of the software computations to one of the parallel computational nodes j so that each of the software computations which communicates application data with a previously mapped node is mapped to a near-neighbor node defined as a node in closest proximity thereto.

13. The computer program product of claim 10, wherein the receiving the communications profile of the software application includes receiving a graph partition map which identifies software computations which are maximally independent as to an amount of software application data communicated there between.

14. The computer program product of claim 13, wherein the graph partition map includes using at least one algorithm to determine cliques and bicliques in a graph.

15. The computer program product of claim 13, wherein the graph partition map includes using a METIS tool.

16. The computer program product of claim 10, wherein the mathematically minimizing $H(i, j)$ the inter-node communication cost function includes minimizing number of hops on a torus between domain i and domain j and wherein the Markov chain is generated by moving a domain to one of an unoccupied and partially occupied node while maintaining computational load balance.

17. The computer program product according to claim 10, wherein the receiving the communications profile of the software application includes receiving the communications profile on the parallel-processing system in which each node is arranged into a 3-D lattice with a torus communication network therebetween.

18. The computer program product according to claim 10, wherein the receiving the communications profile of the software application includes receiving the communications profile on the parallel-processing system which is a Blue Gene/L Supercomputer.

19. The computer-implemented method according to claim 1, wherein the simulated annealing further comprises increasing $\beta$ and continuing the Markov chain process until, for each new $\beta$ a new Free Energy equilibrium is reached.

20. The computer program product according to claim 10, wherein the simulated annealing further comprises increasing $\beta$ and continuing the Markov chain process until, for each new $\beta$ a new Free Energy equilibrium is reached.

* * * * *